(12) United States Patent
Swiler et al.

(10) Patent No.: US 6,541,112 B1
(45) Date of Patent: Apr. 1, 2003

(54) RARE EARTH MANGANESE OXIDE PIGMENTS

(75) Inventors: Daniel Russell Swiler, Washington, PA (US); Enos Ayres Axtell, III, Washington, PA (US)

(73) Assignee: DMC2 Degussa Metals Catalysts Cerdec AG, Frankfurt (DE)

( * ) Notice: Subject to any disclaimer, the term of this patent is extended or adjusted under 35 U.S.C. 154(b) by 226 days.

(21) Appl. No.: 09/589,549

(22) Filed: Jun. 7, 2000

(51) Int. Cl.$^7$ ................................................ B32B 5/16
(52) U.S. Cl. .................... 428/402; 423/263; 423/599
(58) Field of Search ................... 423/599, 263; 428/402

(56) References Cited

U.S. PATENT DOCUMENTS

| | | | |
|---|---|---|---|
| 4,290,923 A | * 9/1981 | Mein et al. .................. 252/462 |
| 5,080,718 A | 1/1992 | Sullivan et al. |
| 5,171,847 A | * 12/1992 | Snaith et al. .................. 534/16 |
| 5,503,815 A | * 4/1996 | Ishii et al. .................. 423/263 |
| 5,795,670 A | * 8/1998 | Araki et al. .................. 429/40 |
| 5,824,278 A | * 10/1998 | Yao .................. 423/263 |
| 5,851,587 A | 12/1998 | Schittenhelm et al. |
| 5,854,587 A | * 12/1998 | Horwitz et al. ......... 338/22 SD |
| 5,858,080 A | 1/1999 | Bugnon |
| 5,897,971 A | * 4/1999 | Araki et al. .................. 429/40 |
| 5,916,700 A | * 6/1999 | Ruka et al. .................. 429/30 |
| 5,976,237 A | 11/1999 | Halko et al. |
| 5,977,017 A | * 11/1999 | Golden .................. 502/525 |

\* cited by examiner

Primary Examiner—H. Thi Le
(74) Attorney, Agent, or Firm—Daniel P. Cillo; Eckert Seamans Cherin & Mellott, LLC (57) ABSTRACT

Rare earth manganese oxides are used as pigments. The pigments are preferably of the formula $(Re_xMn)O_y$, where Re is at least one element selected from Y, La and Lanthanide elements, x is from 0.01 to 99, and y is the number required to maintain electroneutrality. Preferred rare earth elements include Y, La, Pr and Nd. The pigments are useful as colorants, and may possess improved reflectance characteristics in the infrared region, thereby reducing IR-induced heat buildup.

11 Claims, 5 Drawing Sheets

RARE EARTH MANGANESE OXIDE PIGMENTS

FIELD OF THE INVENTION

The present invention relates to pigments with various advantages over traditional pigment formulations. More specifically, the present invention relates to the use of rare earth manganese oxide compositions for use in pigmentary applications. The rare earth constituent may include yttrium, lanthanum and/or metals in the Lanthanide Series of the Periodic Table. The pigments may be used in plastics, paints, coatings, glass enamels and other materials.

BACKGROUND INFORMATION

Pigments are widely used in various applications such as paints, inks, plastics, rubbers, ceramics, enamels and glasses. There are various reasons for using inorganic pigments. Pigments may impart coloristic properties and reflectance properties in the visible as well as ultraviolet (UV) and infrared (IR) reflectance spectrums. Their ability to perform this task depends upon which wavelengths are scattered, and which are absorbed when light interacts with them. In order to be suitable in a wide variety of applications, pigments must demonstrate a high degree of light fastness and high temperature stability. A summary of many inorganic pigments and some of their applications can be found in Volume 18 of the Fourth Edition of the Kirk-Othmer Encyclopedia of Chemical Technology, 1996. Classifications of conventional pigments are also given in the publication "DCMA: Classification and Chemical Description of the Mixed Metal Oxide Inorganic Colored Pigments", Second Edition, January 1982.

Typical black or dark colored pigments for the plastics industry are based on either carbon black, Cr—Fe based hematite blacks, or blacks formulated from various elements, usually containing two or more of the elements Ni, Mn, Cu, Fe and Cr arranged in a spinel type structure. In plastic applications with solar exposure, carbon black pigments absorb light not only in the visible range, but also in the infrared region. This leads to higher temperatures on the exposed colored surface, which may lead to higher cooling costs, or premature failure or degradation of the exposed part. Conventional Cu—Cr oxide compositions, which may contain other additives, do not have particularly good IR reflective properties, but they are useful at moderately elevated temperatures above the exposure temperatures at which carbon black is stable.

Hematite pigments composed of Cr—Fe and spinel pigments composed of transition metal oxides often exhibit IR reflective properties. This means that the pigments reflect more light outside the visible range, particularly in the infrared range, than in the visible range. This provides similar color as other pigments, but with a lower temperature when the object is exposed to infrared radiation.

Currently, several of the pigments classified in the Dry Color Manufacturers Association Classifications (DCMA) are used due to their IR reflective performance. The IR reflective performance is determined by the relative amount of reflectance provided in the solar infrared region of the spectrum, i.e. wavelengths of 700 to 2,500 nm compared with the visible region of the spectrum, i.e. wavelengths of 400 to 700 nm. Common black pigments such as carbon black have low reflectances in both regions. To obtain enhanced IR reflectance, inorganic black pigments from the classification DCMA 13-50-9 chrome iron nickel black spinel, or DCMA 3-05-3 chrome green black spinel, are conventionally used for these applications. The pigment DCMA 13-30-3 cobalt chromite green spinel also provides relatively high IR reflectance.

Manganese is used as a chromophore in several mixed metal oxide pigments. In the corundum structure, it is used to form manganese alumina pink corundum (DCMA 3-04-5). It is used as a chromophore in the rutile structure to form brown pigments, such as manganese antimony titanium buff rutile (DCMA 11-20-6), manganese chrome antimony titanium brown rutile (DCMA 11-46-7) and manganese niobium titanium brown rutile (DCMA 11-47-7). It is also a component in many spinel pigments to form brown or black colors. Examples are manganese ferrite black spinel (DCMA 13-41-9), chrome iron manganese brown spinel (DCMA 13-48-7) and chrome manganese zinc brown spinel (DCMA 13-51-7).

The above mentioned pigments may not provide the desired color values, have the desired chemistry and/or provide the desired infrared reflectance properties for many applications. The present invention provides pigments with enhanced color, composition and performance characteristics.

SUMMARY OF THE INVENTION

This invention relates to rare earth manganese oxide pigments that can be represented by the formula $(Re_xMn)O_y$, where Re represents at least one rare earth element selected from yttrium, lanthanum and elements in the Lanthanide Series of the Periodic Table, x ranges from 0.01 to 99, and y designates the number of oxygen atoms required to maintain electroneutrality. Preferably, x ranges from 0.08 to 12, more preferably from 0.25 to 4, and y ranges from $x+1$ to $2x+2$. These colorants can be used to form colored objects or coatings through their use in applications such as paints, inks, plastics, glasses, ceramics and the like.

An aspect of the present invention is to provide rare earth manganese oxide pigments which impart favorable coloristic properties in the visible spectrum. For example, intense black color may be obtained by these pigments, some of which may also be bluish in shade. The rare earth manganese oxide pigments have shown superior stability and weatherability. These properties are desirable in a wide range of colorant applications.

In accordance with another aspect of the present invention, rare earth manganese oxide pigments provide high infrared reflectance. Yttrium manganese oxide is a particularly preferred pigment which exhibits high IR reflectance. Such high infrared reflectance may result in substantially less heat build up in colored objects using the pigments.

Another aspect of the present invention is to provide pigments which have the ability to change to a different color when exposed to high temperatures. For example, when surfaces containing these materials are subjected to high temperatures by laser marking, legible marks are obtained.

Another aspect of the present invention is to provide pigments which facilitate recycling of colored ceramic or glass articles. When such colored ceramic or glass objects are recycled, less objectionable coloration is passed on to the recycled glass than with conventional black colorants containing cobalt, chromium, nickel and other elements.

Further aspects of the present invention relate to the production of rare earth manganese oxide pigments, substitution of other elements into these pigments, and the use of protective or functional coatings on these pigments in order to enhance their properties.

Another aspect of the present invention is to provide a method of making rare earth manganese oxide pigments. One method includes the steps of mixing rare earth-containing and manganese-containing powders capable of yielding metal oxides, and calcining the mixture.

These and other aspects of the present invention will be more apparent from the following description.

DETAILED DESCRIPTION

The present invention relates to the use of rare earth manganese oxides as pigments. The pigments are of the formula $(Re_xMn)O_y$, where Re is at least one element selected from Y, La and elements of the Lanthanide Series of the Periodic Table, e.g., Ce, Pr, Nd, Pm, Sm, Eu, Gd, Th, Dy, Ho, Er, Tm, Yb and Lu. In the foregoing formula, x ranges from 0.01 to 99, and y designates the number of oxygen atoms required to maintain electroneutrality. Preferably, x ranges from 0.08 to 12, more preferably from 0.25 to 4. The value of y is preferably greater than or equal to x+1 and less than or equal to 2x+2. A preferred compound is of the formula $ReMnO_3$. However, other compounds such as $ReMn_2O_5$ may be suitable for use as pigments. Preferred rare earth elements include Y, La, Ce, Pr, Nd and Sm. For many applications, particularly preferred rare earths include Y, La, Pr and Nd.

In one embodiment of the invention in which the rare earth element includes Y, a preferred pigment is of the formula $YMnO_3$ This compound is based on a perovskite-type structure. Another suitable pigment is of the formula $YMn_2O_5$. It has been found that substitutions of La, lanthanides and other dopants may substitute for the yttrium. In addition, Fe, Ni and other metal atoms may substitute for the manganese constituents of the pigment.

In addition to Y-containing compounds, it has been found that strong colorants may be formed from La or lanthanide manganese oxide compositions. For example, such compounds may comprise $LaMnO_3$, $CeMnO_3$, $PrMnO_3$, $NdMnO_3$ and the like. Where lanthanum, cerium or praseodymiumare are present in the compounds, such pigments are typically black.

The present rare earth manganese oxide pigments typically have average particle sizes of from about 0.1 to about 20 microns, preferably from about 0.2 to about 10 microns, and more preferably from about 0.5 to about 5 microns.

The rare earth manganese oxide materials of the above-noted formula have been found to possess favorable colorant properties. The pigments are useful in many applications, including organic chemical compositions such as plastics, rubbers, and the like, coating compositions such as paints, printing inks, and the like, and inorganic chemical compositions such as glass enamels, porcelain enamels, and the like.

In addition to their use as colorants, the rare earth manganese oxide pigments of the invention may provide improved infrared reflectance and reduced heat buildup properties. As used herein, the term "IR reflectance" means the reflectance properties of a material at wavelengths above about 700 nm. The IR wavelengths include near-IR (750–2,000 nm), mid-IR (2,000–4,000 nm) and far-IR (4,000–5,500 nm).

The rare earth manganese oxide pigments of the present invention may be formed by processes such as mixing and calcining, or chemical techniques such as sol-gel or precipitation, which may then be followed by a calcination step. The pigment compositions may be formed, for example, by mixing yttrium, lanthanum and/or lanthanide-containing powders such as oxides or carbonates with manganese-containing powders such as manganese carbonate, dioxide or tetroxide in the appropriate ratio to form the desired composition, followed by calcining. For example, a particularly preferred process for making yttrium-manganese oxide pigments is to mix yttrium oxide or carbonate with manganese oxide or carbonate powders, followed by calcination. Mixing includes the processes of milling the pigments, either dry or wet, pulverizing, blending or like processes, and calcining. Calcination includes all firing processes such as calcination in periodic, tunnel, or rotary kilns, flash calcination, spray pyrolysis and other techniques which raise the temperature of the material to a higher temperature to promote reaction. The mole ratio of the yttrium oxide or carbonate to manganese oxide or carbonate preferably ranges from about 1:10 to about 10:1, more preferably from about 1:2 to about 2:1. In this embodiment, the mixed powders are preferably calcined at temperatures of from about 700 to about 1,500° C., more preferably from about 900 to about 1,300° C. Calcination times of from about 1 to about 60 hours are preferred, more preferably from about 2 to about 8 hours. For instance, 56.5 weight percent yttrium oxide and 43.5 weight percent manganese dioxide may be mixed and calcined at 1,200° C. for 4 hours to form the pigment. The ratio of yttrium to manganese may be adjusted in order to achieve compositions having the desired color characteristics. Similar molar ratios and calcination procedures may be used for other rare earth compositions.

A full or partial coating of one or more layers may be placed on the surface of the present pigments. Inorganic pigment coatings are known in the art. Examples of coating compositions which may be suitable for use with the present pigments are disclosed in U.S. Pat. Nos. 5,851,587, 5,976,237 and 5,858,080, which are incorporated herein by reference. Coatings may be applied for a variety of reasons. In the case where there is an unfavorable reaction between the surface of the pigment and the medium where it is being used, a protective layer is often used. These protective layers are typically silica, alumina and other metal oxides, but may also be other elements, compounds or organic materials.

Functional coatings may be applied in order to change the conductivity of the surface, modify optical properties or enhance the surface reactivity.

Exemplary coating methods include precipitation, which is typically initiated by passing the pH of a solution through the isoelectric point. Another method comprises coating the pigment particles with a liquid that contains the coating material either in solution or suspension, and drying the particles until a solid coating is produced on the surface of the pigment. Other methods known in the art may also be used.

The pigments of the present invention may be used as colorants for various types of substrates. Plastic or rubber compositions to which the rare earth manganese oxide pigments may be added in accordance with this invention include polymeric materials that are natural or synthetic. Examples include natural resins, rubber, chlororubber, casein, oil-modified alkyd resins, viscose, cellulose acetate, cellulose propionate, cellulose acetobutyrate, nitrocellulose, and other cellulose ethers or esters. Synthetic organic polymers produced by polymerization, polyaddition or polycondensation in thermosetting or thermoplastics can also be colored by the present pigments. Examples are polyethylene, polystyrene, polypropylene, polyisobutylene, polyvinylchloride, polyvinylacetate, polyacrylonitrile, poly acrylic acid and other polyolefins and substituted polyolefms, as well as methacrylic acid esters, butadiene and copolymers thereof. Examples of polyaddition and polycondensation resins are the condensation products of formaldehyde with phenols, phenolic resins, urea, thiourea and melamine, amino resins, polyesters, polyamides, polycarbonates and/or silicones. These polymers can be present individually or as mixtures. The polymers may be in the form of bulk plastic materials, pellets, fibers and the like.

The present pigments may also be used in film formers or binders for lacquers, paints, or printing inks such as linseed oil, nitrocellulose, melamine resins, acrylic resins, ureaformaldehyde resins and the like. The present rare earth manganese oxide pigments may be incorporated in a liquid or a paste form. Suitable liquid carriers for the rare earth manganese oxide pigments include pine oils, vegetable oils, mineral oils, low molecular weight petroleum fractions, tridecyl alcohols, synthetic resins and natural resins.

In a further embodiment, a substrate may be coated with a glass-ceramic enamel composition, including the present pigments and then fired. The substrate may comprise, for example, automotive glass, architectural glass, container glass, metal or the like.

The following examples are intended to illustrate various aspects of the present invention, and are not intended to limit the scope of the invention.

EXAMPLE 1

A pigment is made by mixing 87.0 g $MnO_2$ and 112.9 g $Y_2O_3$ in a blender, and then mixing the powder in a hammer mill through a 0.02-inch screen. The powder mixture is heated in a kiln to 1,200° C., held at this temperature for a period of 4 hours, and then cooled to room temperature. The calcined powder is wet-ground for 1 hour, filtered and dried. The dry powder obtained is a yittrium manganite phase of the formula $YMnO_3$ with a yttrium to manganese ratio of 1:1. The powder is a blue black pigment exhibiting high IR reflectance characteristics.

Tint trials are prepared by mixing 2 grams of $YMnO_3$ pigment with 7 grams of $TiO_2$ in a RPVC resin system, with a total combined weight of 72 grams. This mixture is dispersed on a heated two-roll mill at 420° F. for a period of 3 minutes. Masstone trials are prepared by the same method but have no $TiO_2$ additions. Measurements of color values and reflectance percentage at a wavelength of 1,100 nm are performed using a Datacolor CS-5. The standard CIELAB L*a*b* system is used to define the color of the pigment. The L* refers to the lightness of the sample, with L*=100 designating the lightness upper limit and L*=0 designating the darkness lower limit. The a* describes the red or green value of the pigment, with a positive a* value designating red, and a negative a* value designating green. The b* value represents the blue or yellow value, with a positive b* value designating yellow and a negative b* value designating blue.

Table 1 lists the tint and masstone color values and IR reflectance values of the $YMnO_3$ samples.

TABLE 1

Color and IR Reflectance Values of Tint and Masstone $YMnO_3$ Samples

|  | L* | a* | b* | IR Reflectance at 1,100 nm (%) |
|---|---|---|---|---|
| $YMnO_3$ Tint Sample | 61.83 | −4.12 | −6.38 | 82.47 |
| $YMnO_3$ Masstone Sample | 29.31 | −1.72 | −4.23 | 67.33 |

As can be seen by the color values listed in Table 1, the tint sample has an L* value of less than 65, and the masstone sample has an L* value of less than 30. Furthermore, the negative b* value shows the pigment in Example 1 produces a slightly blue gray color when mixed with the white $TiO_2$ in the tint sample, or a slightly blue black color when used alone in the masstone sample. This blue black color adds extra utility to the pigment because most blue inorganic pigments require cobalt based pigments, such as cobalt aluminate (DCMA13-26-2), to impart a desired blue shade to gray colors. Such conventional blue pigments, due to their cobalt content, are not only expensive, but they often have poor infrared reflecting characteristics between 1,200 and 1,700 nm.

Figure 1:
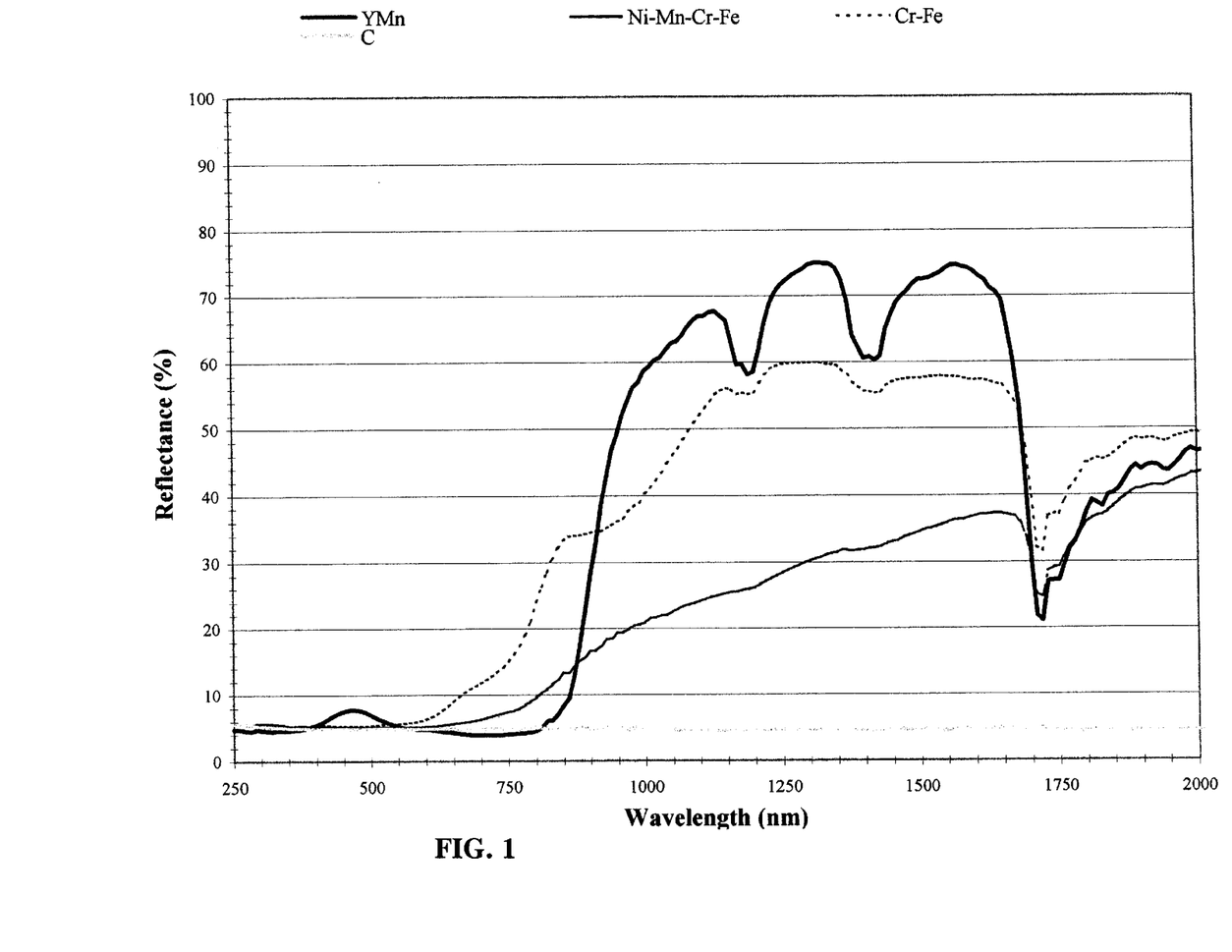
FIG. 1 is a graph illustrating the visible and infrared reflectance characteristics for black Y—Mn—O pigments of the present invention in a masstone application in comparison with conventional Cr—Fe—O, Ni—Mn—Cr—Fe—O and carbon black pigments.

FIG. 1 illustrates the improved IR reflectance characteristics achieved with a yttrium-manganese oxide pigment masstone sample of the present invention produced in Example 1 in comparison with conventional pigments. The reflectance curves of the Y—Mn—O pigment are compared with Ni—Mn—Fe—Cr—O black pigment and carbon black in RPVC masstone trials. The Y—Mn—O masstone sample shown in FIG. 1 was prepared by mixing 2 grams of pigment with an unpigmented RPVC resin, as described in Example 1. The comparison samples were also combined with RPVC in a similar manner. In each case the pigments were fused into the RPVC on a two-roll mill, and then pressed flat.

As illustrated in FIG. 1, materials comprising the present yttrium manganese oxide pigment possess comparable color and reflectance characteristics at visible wavelengths in comparison with the conventional colorants, but possess markedly increased reflectance characteristics at IR wavelengths in comparison with the conventional pigments. Articles colored with the present pigments, thus appear relatively dark at visible wavelengths and relatively light at IR wavelengths. These reflectance characteristics are highly advantageous in applications where heat buildup due to the absorption of IR radiation is to be minimized.

Articles incorporating the present pigments, such as the Y—Mn—O sample shown in FIG. 1, which exhibit IR reflectances of greater than, e.g., 50 percent at 1,100 nm, will generally perform well in heat buildup tests. Thermal energy from solar radiation is absorbed at wavelengths of up to about 2,500 nm. In an embodiment of the present invention, the rare earth manganese oxide pigments of the present invention preferably exhibit high IR reflectances at wavelengths of up to 2,500 nm and above.

In addition to the masstone results illustrated in FIG. 1, comparative tint trials were performed in order to evaluate the color of the present Y—Mn—O pigment and conventional pigments when mixed with a white $TiO_2$ pigment. The tint samples were prepared as described in Example 1 by mixing each pigment with 70 grams of resin containing approximately 10 percent pigmentary grade $TiO_2$. This provides a way to evaluate the IR reflective properties of the present pigments in comparison with other pigments when mixed in a color formulation.

Figure 2:
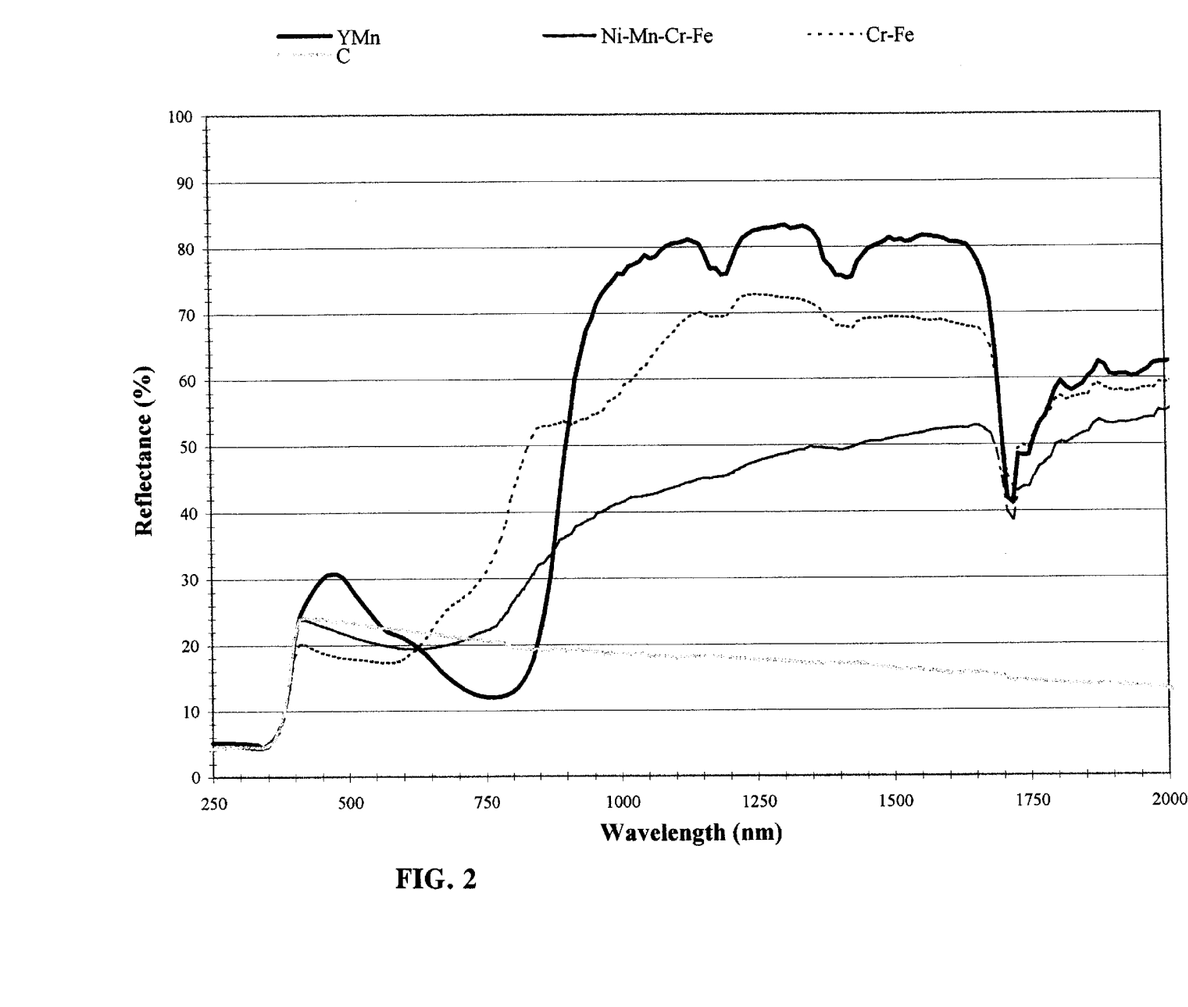
FIG. 2 is a graph illustrating the visible and infrared reflectance characteristics for black Y—Mn—O pigments of the present invention in a tint application, in comparison with conventional Cr—Fe—O, Ni—Mn—Cr—Fe—O and carbon black pigments.

FIG. 2 illustrates the improved IR reflectance characteristics achieved with the yttrium-manganese oxide pigment tint sample of the present invention in comparison with the conventional Ni—Mn—Fe—Cr—O, Cr—Fe—O and carbon black tint samples. As illustrated in FIG. 2, the tint sample comprising the present yttrium-manganese oxide pigment possesses good color and reflectance characteristics at visible wavelengths in comparison with the conventional colorants, but possesses substantially increased reflectance characteristics at IR wavelengths in comparison with the conventional pigments. As shown in FIG. 2, reflectance values for the tint sample containing the present Y—Mn—O pigment are above 75 percent throughout a substantial portion of the IR region, with reflectance values above 80 percent in some parts of the IR spectrum.

As demonstrated in FIG. 2, in tint applications, the yttrium manganese oxide pigments typically reflect more in one or more wavelengths in the infrared region of the spectrum than in the visible region of the spectrum. The amount of this reflectance increase depends upon the amount of the pigment used compared to other pigments in the color formulation, and the matrix that contains these pigments. For example, when only a small amount of pigment is added, and the $TiO_2$ of the tint sample produces a very high reflectance in the visible range, only small increases in the IR reflectance is expected. When the present rare earth manganese oxide pigments are calcined and ground for a time of from about 1 to about 6 hours and used in RPVC tint applications as described in the examples herein, they are capable of achieving an IR reflectance at a wavelength between 700 and 2,500 nm of greater than about 50 percent, preferably greater than about 60 percent. The present pigments are more preferably capable of achieving an IR reflectance of greater than about 70 percent in such RPVC tint applications, with an IR reflectance of greater than about 75 or 80 percent being particularly preferred for some of the pigments.

Another measure of the improvement in the reflectivity in the IR region is by using the standard Kubelka Munk scattering equation: $K/S=(1-R)^2/2R$, where R is the measured reflectance of the material, after accounting for surface reflection. In the case where a completely opaque sample is produced by adding high scattering pigments, and effects of surface scattering are negligible, the amount of scattering (S) may be calculated versus the amount of absorption (K) for the pigment itself. By applying the Kubleka Munk equation to samples with significant amounts of pigmentary grade $TiO_2$, characteristic of our tint trials, and by subtracting typically 4.5 percent from the reflectance values to compensate for reflection at the surface of the article, the K/S can be calculated. This calculation shows that the K/S in the optical region is much higher or more absorbing that in the IR regions.

Figure 3:
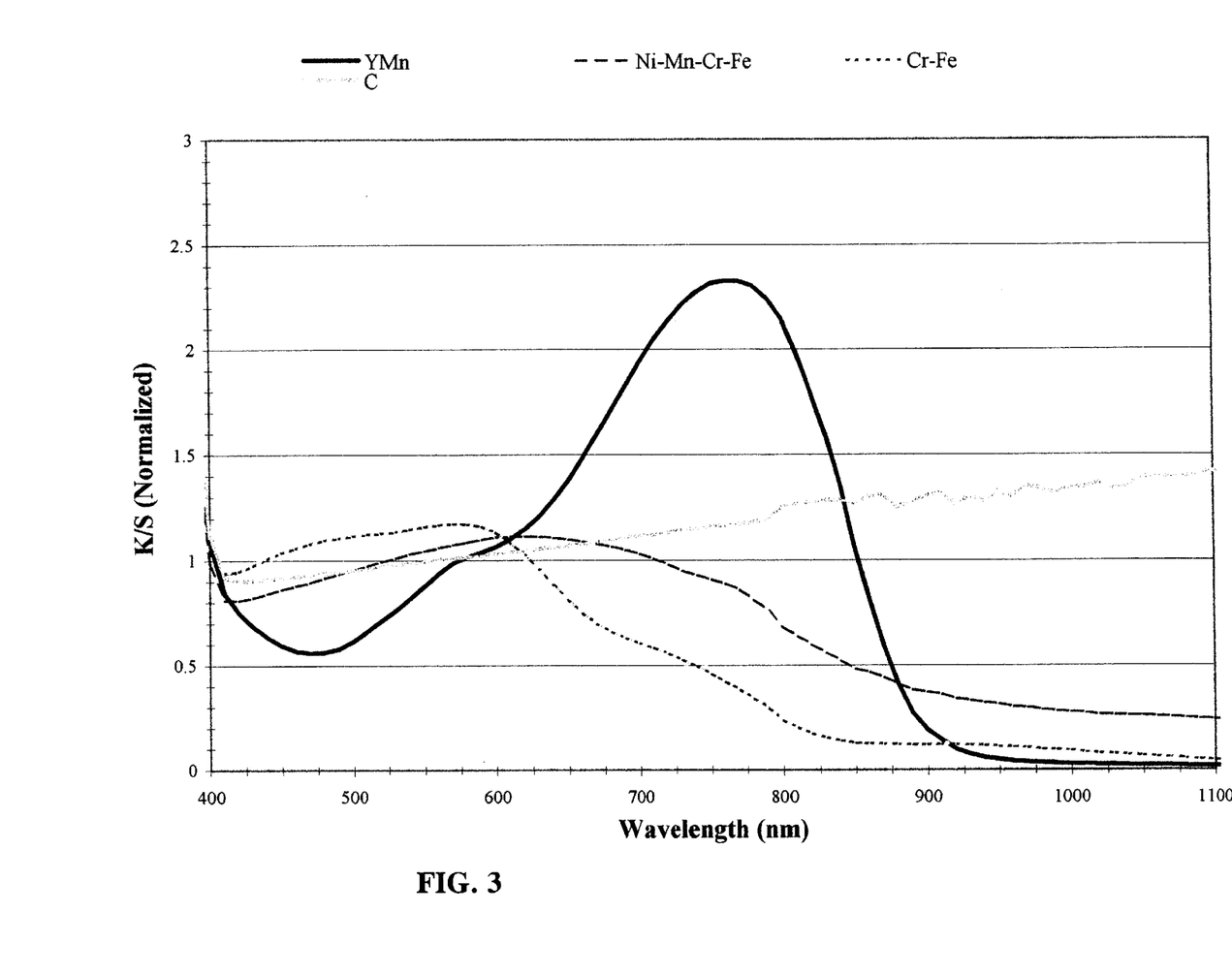
FIG. 3 is a graph illustrating visible and infrared Kubelka Munk scattering (K/S) values, normalized to be an average of 1 in the visible range of 400 to 700 nanometers for black Y—Mn—O pigments of the present invention, in comparison with conventional Cr—Fe—O, Ni—Mn—Cr—Fe—O and carbon black pigments.

A plot showing the K/S values for a $YMnO_3$ pigment powder of the present invention with an average particle size of about 1 micron, with the visible region normalized to a value of 1, is shown in FIG. 3. The present pigments preferably exhibit K/S values compared to wavelengths in the visible region of about 50 percent or less for at least one of the infrared wavelengths above 800 nm, more preferably less than about 30 percent, and most preferably less than about 15 percent.

In accordance with the present invention, plastic, rubber, paint and other compositions incorporating the present pigments may possess reduced heat buildup characteristics due to the improved IR reflectance properties. Also, various types of substrates may be coated with the present pigments, such as wood, glass, ceramic, metal, plastic and composite substrates to provide an organic coating or paint which provides low heat buildup properties.

As shown below in Table 2, a masstone sample comprising the $YMnO_3$ pigment produced as described in Example 1 exhibits substantially decreased heat buildup when subjected to IR radiation in comparison with commercially available pigments incorporated in similar masstone samples. The comparative pigments listed in Table 2 are commercially available: Columbian Chemical Co. Raven 450 (carbon black); Cerdec 10335 (Co—Cr—Fe); and Cerdec 10333 (Ni—Mn—Cr—Fe). The ability of the present pigments to reduce IR-induced heat buildup has particular significance for uses such as architectural, automotive, military, aerospace, industrial and electronics applications.

TABLE 2

Infrared Radiation Induced Heat Buildup Measurements ASTM D4803

| Sample | Max Temp. (° F.) | Heat build-up difference (° F.) |
|---|---|---|
| Carbon Black | 210.0 | — |
| $YMnO_3$ | 175.1 | −34.9 |
| Co-Cr-Fe | 204 | −6.0 |
| Ni-Mn-Cr-Fe | 190.2 | −19.8 |

EXAMPLE 2

Pigments are made as described in Example 1, except instead of a calcination temperature of 1,200° C., each powder mixture is heated in a kiln to a temperature of either 1,100° C. or 1,300° C., held at the temperature for a period of 4 hours, and then cooled to room temperature. The calcined powders are wet-ground in a ball mill for 4 hours, filtered and dried. The dry powders comprise a yttrium manganate phase of the formula $YMnO_3$ with a yttrium to manganese ratio of 1:1. The powders are blue black and exhibit color and high IR reflectance characteristics, as shown in Table 3. In each case, the L* values are less than 65.

TABLE 3

Color and IR Reflectance Values of Tint $YMnO_3$ Samples

| $YMnO_3$ Calcination Temp. (° C.) | L* | a* | b* | IR Reflectance at 1,100 nm (%) |
|---|---|---|---|---|
| 1,100 | 63.87 | −3.40 | −5.36 | 78.93 |
| 1,300 | 63.79 | −3.55 | −5.48 | 74.13 |

EXAMPLE 3

A $YMnO_3$ pigment prepared as in Example 1 was tested in a typical automotive glass enamel coating on a glass substrate in comparison with a typical Cu—Cr spinel black. Exposure temperatures ranged from 100 to 1,250° F. The $YMnO_3$ pigment was stable up to temperatures of 1,200° F.

in the glass enamel. At a temperature of about 2,000° F. the substrate glass melted. Where the yttrium manganese oxide pigment of the present invention showed no coloration of the melted glass, the conventional Cu—Cr black left a green coloration on the surface of the glass, presumably due to residual Cr oxide. This demonstrates that the present rare earth manganese oxide pigments may be more suitable in applications where colored glass objects are recycled.

EXAMPLE 4

Several pigment compositions are made as follows. The formulations listed in Table 4 are mixed in a kitchen type blender for 2 minutes. Each powder mixture is heated in a kiln to 1,200° C., held at this temperature for a period of 4 hours, and then cooled to room temperature. The calcined powders are wet-ground with zirconia bead media for 6 hours, filtered and dried. The dry powders are tested in RPVC tint samples.

TABLE 4

Pigment Starting Materials (Weight in Grams)

| Sample No. | $MnO_2$ | $Y_2O_3$ | $Pr_6O_{11}$ | $La_2O_3$ | $Fe_2O_3$ | $Al_2O_3$ | $Cr_2O_3$ |
|---|---|---|---|---|---|---|---|
| 1 | 87 | 112.9 | | | | | |
| 2 | 87 | 111.8 | 1.7 | | | | |
| 3 | 87 | 90.3 | 17.0 | | | | |
| 4 | 87 | 111.8 | | 13.5 | | | |
| 5 | 87 | 90.3 | | 1.3 | | | |
| 6 | 86.2 | 112.9 | | | 0.8 | | |
| 7 | 78.3 | 112.9 | | | 8.0 | | |
| 8 | 78.3 | 112.9 | | | | 5.1 | |
| 9 | 78.3 | 112.9 | | | | | 7.6 |

The pigment tint samples made in Example 4 have color and IR reflectance values given in Table 5. In all cases, the tint samples exhibited $L^*$ values of less than 60, and each pigment exhibited a strong blue color. Many of the additions had no major effect on the IR reflectivity at 1,100 nm.

TABLE 5

Color and IR Reflectance Values of Tint Samples

| Sample No. | $L^*$ | $a^*$ | $b^*$ | IR Reflectance at 1,100 nm (%) |
|---|---|---|---|---|
| 1 | 57.59 | −5.81 | −7.56 | 81.20 |
| 2 | 57.52 | −5.62 | −7.31 | 67.51 |
| 3 | 56.04 | −4.38 | −5.49 | 37.65 |
| 4 | 57.56 | −5.53 | −7.59 | 45.22 |
| 5 | 57.60 | −5.13 | −5.06 | 67.34 |
| 6 | 57.53 | −5.74 | −7.52 | 80.24 |
| 7 | 56.63 | −5.74 | −6.37 | 73.34 |
| 8 | 57.24 | −5.35 | −7.57 | 70.79 |
| 9 | 56.07 | −3.87 | −5.48 | 54.57 |

EXAMPLE 5

A pigment is made by mixing 234.2 g $MnO_2$ and 112.9 g $Y_2O_3$ in a blender, and then mixing the powder in a hammer mill through an 0.02 inch screen. The powder mixture is heated in a kiln to 1,100° C., held at this temperature for a period of 4 hours, and then cooled to room temperature. The calcined powder is wet-ground with zirconia media for 2 hours, filtered and dried. The resultant $YMn_2O_5$ dry powder is incorporated in a tint sample in the same manner as Example 1. The tint sample has color values of $L^*$=54.58, $a^*$=1.04, and $b^*$=−1.25. The tint sample also has an IR reflectance value of 82.10 percent at 1,100 nm. The composition is a reddish shade black with high IR reflectance characteristics.

EXAMPLE 6

A pigment is made by mixing 43.5 g $MnO_2$ and 85.0 g $Pr_6O_{11}$ in a blender. The powder mixture is heated in a kiln to 1,200° C., held at this temperature for a period of 4 hours, and then cooled to room temperature. The calcined powder is wet-ground with zirconia media for 6 hours, filtered and dried. The pigment is tested in a RPVC masstone sample in comparison with a commercially available Cu—Cr pigment, Shepherd 1 Cu—Cr spinel, in a similar RPVC masstone sample. The color values are shown in Table 6.

TABLE 6

Color Values of Masstone Samples

| Sample | $L^*$ | $a^*$ | $b^*$ |
|---|---|---|---|
| Cu-Cr | 26.24 | 0.04 | −0.92 |
| Pr-Mn-O | 27.12 | −0.03 | −0.33 |

In addition to the RPVC masstone test, the Pr—Mn—O pigment of Example 6 was tested in a glass enamel fired to 1,250° F. The glass enamel comprised a conventional lead-free frit plus 25 weight percent of the pigment. The Pr—Mn—O pigment of Example 6 maintained a darker $L^*$ value and a more blue shade than the conventional Cu—Cr pigment used in this application, as shown in

TABLE 7

Color Values of Glass Enamel Samples

| Sample | $L^*$ | $a^*$ | $b^*$ |
|---|---|---|---|
| Cu-Cr | 3.02 | −0.56 | 0.57 |
| Pr-Mn-O | 2.85 | −0.56 | −0.62 |

The glass enamel was then placed on a bed of sand, and reheated to 1,000° C. The residual color on the surface of the glass object is a measure of the discoloration that will be present in recycled glass. The Pr—Mn—O pigment of Example 6 showed much less discoloration of the glass. Although this test is somewhat subjective, color values were measured of the uncoated glass sample, and the areas where the glass was colored with the conventionally pigmented and the Pr—Mn—O pigmented glass enamel. The color results are shown in Table 8.

TABLE 8

Color Values of Reheated Glass Enamel Samples

| Reheat Sample | $L^*$ | $a^*$ | $b^*$ | $dL^*$ |
|---|---|---|---|---|
| Melted glass (uncoated) | 41.61 | −6.93 | 1.28 | — |
| Cu-Cr | 32.92 | −0.74 | 3.38 | −8.68 |
| Pr-Mn-O | 39.85 | −2.66 | 1.71 | −1.75 |

These data support the visual assessment that the new Pr—Mn—O pigment discolors the glass much less than the traditional pigment. This is a very important advantage with respect to recyclability of glass articles.

EXAMPLE 7

The Pr—Mn—O pigment of Example 6 is tested in a RPVC tint application as described in Example 1. The color values are reported in Table 9.

EXAMPLE 8

A pigment is made by mixing 43.5 g $MnO_2$ and 67.6 g $La_2O_3$ in a blender. The powder mixture is heated in a kiln to 1,200° C., held at this temperature for a period of 4 hours, and then cooled to room temperature. The calcined powder is wet-ground with zirconia media for 6 hours, filtered and dried. The resultant La—Mn—O pigment is tested in a RPVC tint application. The color values are reported in Table 9.

EXAMPLE 9

A pigment is made by mixing 43.5 g $MnO_2$ and 81.1 g $CeO_2$ in a blender. The powder mixture is heated in a kiln to 1,200° C., held at this temperature for a period of 4 hours, and then cooled to room temperature. The calcined powder is wet-ground with zirconia media for 6 hours, filtered and dried. The resultant Ce—Mn—O pigment is tested in a RPVC tint application. The color values are reported in Table 9.

EXAMPLE 10

A pigment is made by mixing 10.88 g $MnO_2$ and 21.02 g $Nd_2O_3$ in a mortar and pestle. The powder mixture is heated in a kiln to 1,200° C., held at this temperature for a period of 4 hours, and then cooled to room temperature. The calcined powder is wet-ground with zirconia media for 6 hours, filtered and dried. The resultant Nd—Mn—O pigment is tested in a RPVC tint application. The color values are reported in Table 9.

TABLE 9

Color Values of Tint Samples

| Sample | L* | a* | b* |
|---|---|---|---|
| Pr-Mn-O | 49.39 | −1.61 | −3.70 |
| La-Mn-O | 49.86 | −1.81 | −2.89 |
| Ce-Mn-O | 72.62 | 6.74 | 16.71 |
| Nd-Mn-O | 49.46 | −1.09 | −1.73 |

Of the pigment samples listed in Table 9, the Pr—Mn—O, La—Mn—O and Nd—Mn—O samples demonstrate exceptional performance for black pigments. The L* value of each of these tint samples is less than 50. Not only do they provide a dark gray shade, these pigments also provide more tinting power than many conventional spinel black pigments.

EXAMPLE 11

Several additional pigment compositions containing Pr were prepared in a similar manner as described in Example 6. The weight of the starting materials (in grams), the calcination temperature of each sample, and the L*, a* and b* values in tint applications of each sample are listed in Table 10. In Table 10, $CoO_x$ represents a cobalt oxide of mixed oxidation states where the metals content is approximately 72.5 weight percent.

TABLE 10

Color Values of Tint Samples

| Sample No. | $MnO_2$ | $Pr_6O_{11}$ | $CoO_x$ | CuO | Temp. (° C.) | L* | a* | b* |
|---|---|---|---|---|---|---|---|---|
| 10 | 87 | 170.3 | | | 1,200 | 50.6 | −1.6 | −4.0 |
| 11 | 43.5 | 170.3 | 40.9 | | 1,200 | 44.9 | −0.4 | −3.7 |
| 12 | 29 | 170.3 | 27.3 | 26.0 | 1,100 | 47.5 | −0.1 | −1.5 |

From the foregoing examples, it can be seen that the pigments of the present invention possess favorable colorant properties in the visible spectrum. When the pigments are calcined and ground for a time of from about 1 to about 6 hours and used in RPVC tint applications as described in the foregoing examples, they are capable of achieving CIELAB L* lightness values of less than about 65, preferably less than about 60. The present pigments are more preferably capable of achieving L* values of less than about 55 in such RPVC tint applications, with an L* value of less than about 50 being particularly preferred for some of the pigments. When the pigments are calcined and ground for a time of from about 1 to about 6 hours and used in RPVC masstone applications as described in the foregoing examples, they are preferably capable of achieving CIELAB L* values of less than about 35, more preferably less than about 30.

Another measure of pigment colorant properties is provided in terms of strength. Pigment strength is a measure of how much pigment is needed to produce a desired color compared with a standard pigment, for example, when mixed with a scattering pigment such as $TiO_2$ in a tint application. For example, in a sample where twice as much pigment must be mixed with $TiO_2$ to develop the same color as a standard pigment, such a pigment would be half as strong as the standard pigment, or have a strength of 50 percent. Strength can be measured by adding pigment to samples until the color value is similar to a standard sample, and then calculating the strength value based upon the amount of pigment required. For black pigments, strength values are closely related to L* values. Stronger black pigments yield lower L* values, while weaker black pigments yield higher L* values. Table 11 lists strength, L*, a* and b* values for tint samples containing a standard Cu—Cr black pigment (Shepherd 1 Cu—Cr) in comparison with conventional Cerdec 10333 Ni—Mn—Fe—Cr and Cerdec 10335 Co—Cr—Fe black pigments and the Y—Mn—O and Pr—Mn—O pigments of the present invention. The Y—Mn—O pigment listed in Table 11 was made as described in Example 4, while the Pr—Mn—O pigment was made as described in Example 6.

TABLE 11

Comparative Strength and Color Values of Tint Samples

| Sample | Strength | L* | a* | b* |
|---|---|---|---|---|
| Shepherd 1 Cu-Cr | 100 | 55.57 | −1.63 | −4.23 |
| 10333 Ni-Mn-Fe-Cr | 116.4 | 53.73 | 0.02 | −3.98 |
| 10335 Co-Cr-Fe | 91.3 | 56.66 | −0.63 | −3.18 |
| Y-Mn-O | 82.4 | 57.92 | −5.59 | −7.36 |
| Pr-Mn-O | 145.2 | 51.39 | −1.45 | −3.84 |

As shown by the strength values and tint color values listed in Table 11, the present rare earth manganese oxide pigments have strengths comparable to or higher than conventional pigments. Many materials which appear black may have poor pigmentary properties, hence a relatively limited number of commercial chemistries are currently used for black pigments even though inorganic black compounds are quite numerous. The present rare earth manganese oxide compounds thus possess the ability to yield strong black colors when used as pigments. Other properties such as gloss, or surface smoothness of a paint film, may also be improved in comparison with existing inorganic black pigments. The present pigments typically have strengths of at least about 50 percent in comparison with the standard Shepherd 1 Cu—Cr black pigment, preferably at least about 80 percent. Some of the present pigments have strengths of at least 100 or 120 percent compared with the standard Cu—Cr black pigment. Such strengths may be achieved in tint applications, as well as other applications such as conventional ink and paint formulations modified to include the present rare earth manganese oxide pigments.

Figure 4:
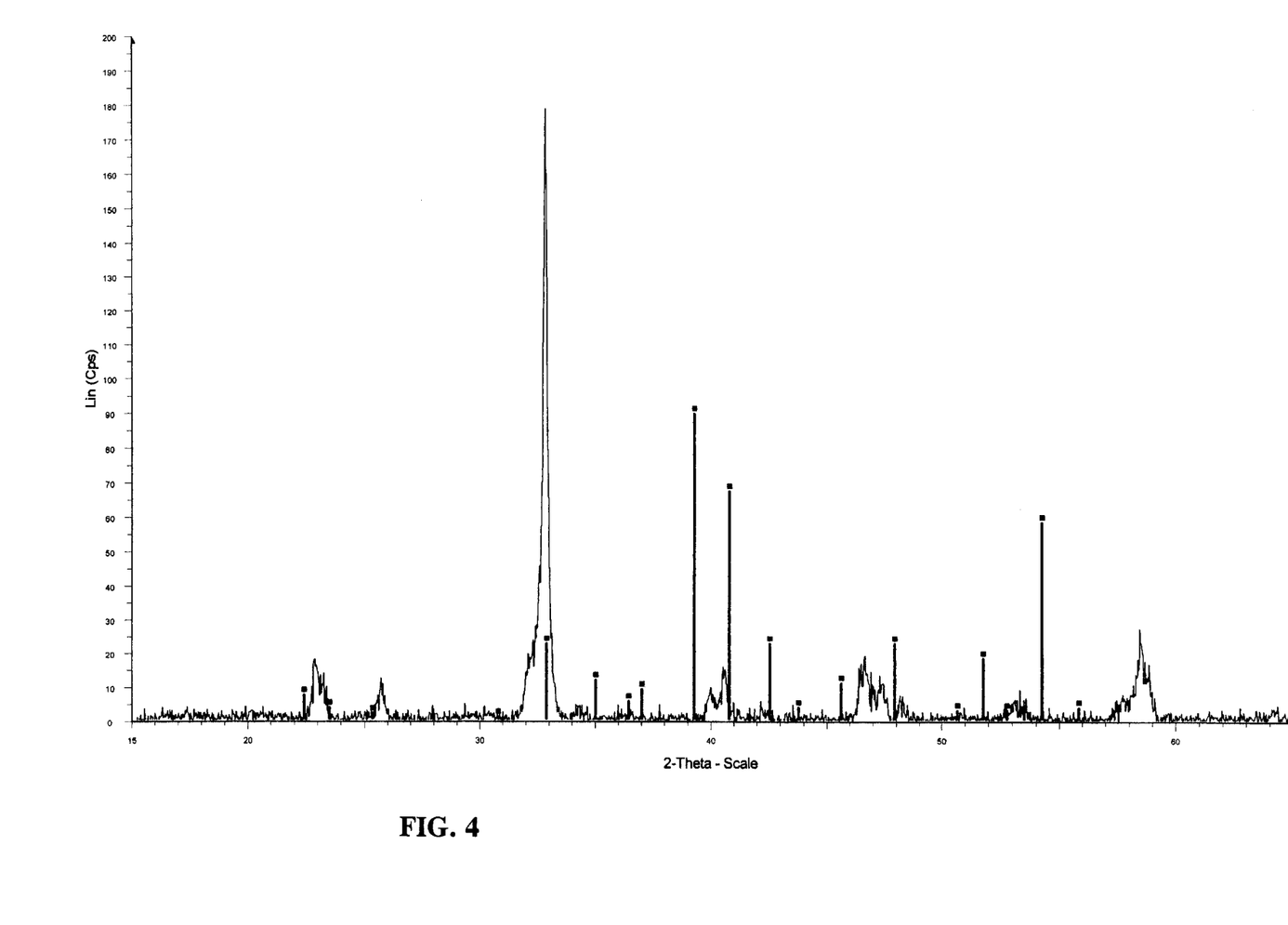
FIG. 4 is an x-ray diffraction pattern from a Pr—Mn—O pigment of the present invention overlaid on a known diffraction pattern.

The Pr—Mn—O samples listed in Table 10 were characterized by x-ray diffraction analysis. FIG. 4 is an x-ray diffraction pattern from Pr—Mn—O Sample No. 10 listed in Table 10 overlaid on the only published compound in the standard JCPDS diffraction file containing the elements Pr, Mn and O (35-0166, Mn1.03, Pr0.97, O3). The peaks shown in FIG. 4 for the Pr—Mn—O sample represent x-ray reflections at certain angular orientations which may be described by the following equation: $n\lambda = 2d \sin\theta$, where d=the distance between crystal planes, $\lambda$ is the wavelength of the incident x-rays, and $\theta$ is the angle of incidence where reflection occurs. The distances between crystal planes (d spacings) are associated with approximate intensity values used for identification purposes, which are typically described in terms of relative intensity percentages. The different peaks appearing in such x-ray diffraction patterns are indicative of the type of crystal structure of the sample and the d spacings of the sample. As can be seen in FIG. 4, the Pr—Mn—O pigment of the present invention corresponds with an x-ray diffraction pattern having peaks which do not match the x-ray diffraction pattern of the prior composition. Similar x-ray diffraction trials of Pr—Mn—O Sample Nos. 11 and 12 listed in Table 10 also revealed a significant amount of a phase which yields a similar diffraction pattern as Pr—Mn—O Sample No. 10.

Figure 5:
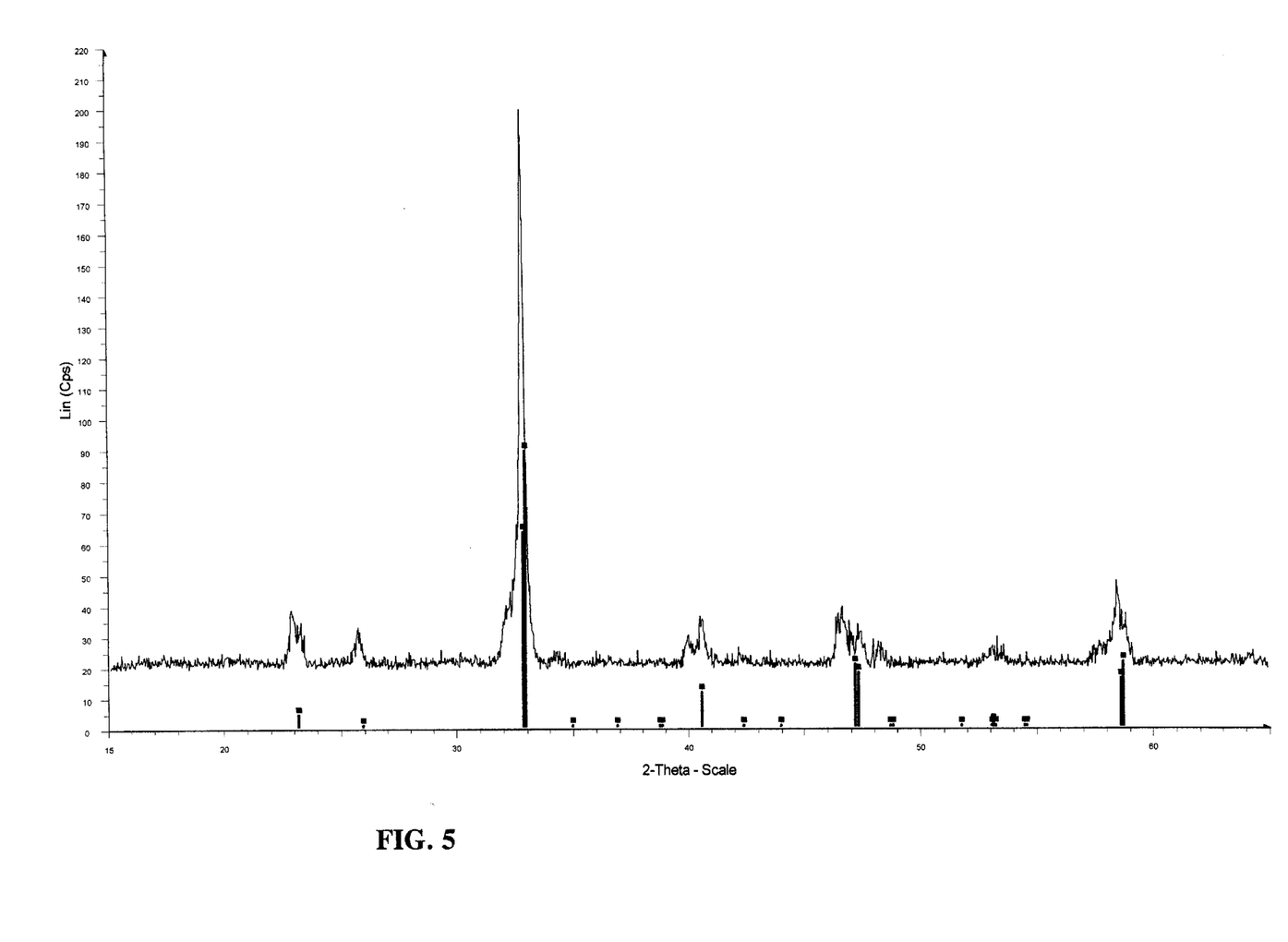
FIG. 5 is an x-ray diffraction pattern from a Pr—Mn—O pigment of the present invention overlaid on another known diffraction pattern.

As shown in FIG. 5, the x-ray diffraction pattern of Pr—Mn—O Sample No. 10 relates more closely to the orthorhombic $(La_{0.6}Ca_{0.4})MnO_3$ phase described in the JCPDS diffraction file. This provides an indication that the Pr—Mn—O samples listed in Table 10 comprise a similar crystal structure.

The Pr—Mn—O samples listed in Table 10, which exhibit x-ray diffraction patterns as shown in FIGS. 4 and 5, have d spacings in Angstroms of approximately 2.721 (100%) and 2.728 (71%) which appear as one peak, 1.571 (24%), 1.926 (23%) and 2.222 (13%). The d spacings may vary slightly, for example, up to about 5 percent. The intensities listed in parentheses are approximate values used for identification purposes and may vary significantly for a given crystal structure.

In accordance with an embodiment of the present invention, compounds having crystal structures and d spacings which result in x-ray diffraction patterns substantially as shown in FIGS. 4 and 5 have been found to possess very favorable pigmentary properties. While not intending to be bound by any particular theory, pigments exhibiting such x-ray diffraction patterns containing praseodymium and manganese seem to have very strong colorant properties. This may be due to the crystal structure of the compounds, as well as the fact that multiple oxidation states may be maintained by both the manganese and the praseodymium while still maintaining the listed ratio of metal atoms to oxygen atoms, i.e., Pr and Mn may be both in the 3+ state, or may transform to the Pr4+ and Mn2+ states. This transition may provide enhanced optical absorbtion.

The present rare earth manganese oxide pigments possess several advantages. In some cases, use of the present pigments is based on the fact that they have good pigmentary properties in the visible range. They are stable in a wide range of applications, and possess excellent heat and weathering ability. A further advantage of some of the present pigments is that the IR reflectance is higher in comparison with conventional pigments. Another advantage of the present rare earth manganese oxide pigments is based upon their chemistry. Typical colorants for the glass and ceramic industry may contain copper, nickel or chromium in their formulations. When glasses decorated with these pigments are recycled, the aforementioned elements cause objectionable color or physical properties in the recycled glass. However, the present rare earth manganese oxide compounds do not substantially discolor recycled objects, and are less of a problem in recycled material. Therefore, due to more stringent recycling efforts, the present colorants can be used where traditional colorants cannot.

Whereas particular embodiments of this invention have been described above for purposes of illustration, it will be evident to those skilled in the art that numerous variations of the details of the present invention may be made without departing from the invention as defined in the appended claims.

What is claimed is:

1. A pigment comprising rare earth manganese oxide selected from the group consisting of $YMnO_3$, $YMn_2O_5$ and $PrMnO_3$, wherein the pigment is capable of achieving a strength value of at least about 50 percent compared with a standard Cu—Cr black pigment.

2. The pigment of claim 1, wherein the pigment comprises particles having an average size of from about 0.2 to about 10 microns, and where the strength value is compared with Shepherd 1 Cu—Cr in a tint application when mixed with a $TiO_2$ scattering pigment.

3. The pigment of claim 1, wherein the pigment comprises particles having an average size of from about 0.5 to about 5 microns.

4. The pigment of claim 1, wherein the pigment is capable of achieving a strength value of at least about 50 percent compared with a standard Cu—Cr black pigment in an ink or paint application.

5. The pigment of claim 1, wherein the pigment is capable of achieving a strength value of at least about 80 percent compared with a standard Cu—Cr black pigment in an ink or paint application.

6. The pigment of claim 1, wherein the pigment is capable of achieving a strength value of at least about 100 percent compared with a standard Cu—Cr black pigment in an ink or paint application.

7. The pigment of claim 1, wherein the pigment is capable of achieving a strength value of at least about 120 percent compared with a standard Cu—Cr black pigment in an ink or paint application.

8. The pigment of claim 1, wherein the pigment exhibits an increased reflectance at infrared wavelengths in comparison with visible wavelengths.

9. The pigment of claim 1, wherein the pigment exhibits an absorption to scattering ratio K/S of less than about 50 percent at an infrared wavelength above 800 nm in comparison with visible wavelengths.

10. The pigment of claim 1, wherein the pigment exhibits an absorption to scattering ratio K/S of less than about 30 percent at an infrared wavelength above 800 nm in comparison with visible wavelengths.

11. The pigment of claim 1, wherein the pigment exhibits an absorption to scattering ratio K/S of less than about 15 percent at an infrared wavelength above 800 nm in comparison with visible wavelengths.

* * * * *